(12) United States Patent
Moretti

(10) Patent No.: US 12,005,625 B2
(45) Date of Patent: Jun. 11, 2024

(54) METHOD FOR MAKING A CONTAINER FOR A FLUID SUBSTANCE DISPENSING DEVICE AND DISPENSING DEVICE FOR THE SAID FLUID SUBSTANCE

(71) Applicant: LUMSON S.p.A., Capergnanica (IT)

(72) Inventor: Matteo Moretti, Crema (IT)

(73) Assignee: LUMSON S.P.A., Capergnanica (IT)

( * ) Notice: Subject to any disclaimer, the term of this patent is extended or adjusted under 35 U.S.C. 154(b) by 0 days.

(21) Appl. No.: 17/847,451

(22) Filed: Jun. 23, 2022

(65) Prior Publication Data

US 2023/0001622 A1 Jan. 5, 2023

(30) Foreign Application Priority Data

Jul. 2, 2021 (IT) .................. 102021000017447

(51) Int. Cl.
*B29C 49/00* (2006.01)
*B05B 11/00* (2023.01)
(Continued)

(52) U.S. Cl.
CPC .......... *B29C 49/071* (2022.05); *B05B 11/026* (2023.01); *B05B 11/1047* (2023.01); *B29C 45/16* (2013.01); *B29C 2045/1601* (2013.01); *B29L 2009/001* (2013.01); *B29L 2031/7158* (2013.01)

(58) Field of Classification Search
CPC .................. B29C 49/071; B29C 45/16; B29C 2045/1601; B29C 2949/0715; B29C 2949/3094; B29C 49/06; B29C 49/22; B29C 2949/0778; B05B 11/026; B05B 11/1047; B05B 11/1023; B05B 11/1069;
(Continued)

(56) References Cited

U.S. PATENT DOCUMENTS 4,451,512 A * 5/1984 Yazaki .................. B32B 27/306
  215/373
4,550,043 A * 10/1985 Beck .................... B29C 45/1643
  215/44

(Continued)

*Primary Examiner* — Donnell A Long
(74) *Attorney, Agent, or Firm* — Dickinson Wright PLLC; Andrew D. Dorisio

(57) ABSTRACT

A method for making a fluid substance container starting from a preform, the container coupled by a ring nut to a hermetic pump to form a fluid substance dispensing device, including heating and blow-moulding the preform to obtain the container; the preform formed of an external body and an internal body mutually assembled before being blow-moulded, the external body being cup-shaped with a first free end, the internal body being cup-shaped with a second free end having a flange whereby, when the internal body and external body are assembled, the flange abuts the first free end and protrudes a distance along an external perimeter of the external body near the free end, the external body being configured to form—once blow-moulded—the external recipient of the container while the internal body is configured to form a deformable bag housed inside the container, the ring nut having a undercut which engages the flange so that when the ring nut is removed the now empty deformable bag comes with it, in addition to the pump.

9 Claims, 5 Drawing Sheets

(51) Int. Cl.
  *B05B 11/02*   (2023.01)
  *B05B 11/10*   (2023.01)
  *B29C 45/16*   (2006.01)
  *B29L 9/00*    (2006.01)
  *B29L 31/00*   (2006.01)

(58) Field of Classification Search
  CPC ............... B05B 11/0044; B05B 15/30; B29L 2009/001; B29L 2031/7158; B29B 11/14
  See application file for complete search history.

(56) References Cited

U.S. PATENT DOCUMENTS

| | | | |
|---|---|---|---|
| 4,675,219 A * | 6/1987 | Muneki | B32B 1/02 |
| | | | 428/483 |
| 4,743,479 A * | 5/1988 | Nakamura | B29C 45/1646 |
| | | | 264/513 |
| 2010/0044393 A1 | 2/2010 | Moretti | |
| 2010/0200586 A1* | 8/2010 | Furusawa | B32B 7/06 |
| | | | 220/62.11 |
| 2010/0264166 A1 | 10/2010 | Moretti | |
| 2011/0024452 A1 | 2/2011 | Moretti | |
| 2018/0044160 A1 | 2/2018 | Witte et al. | |

\* cited by examiner

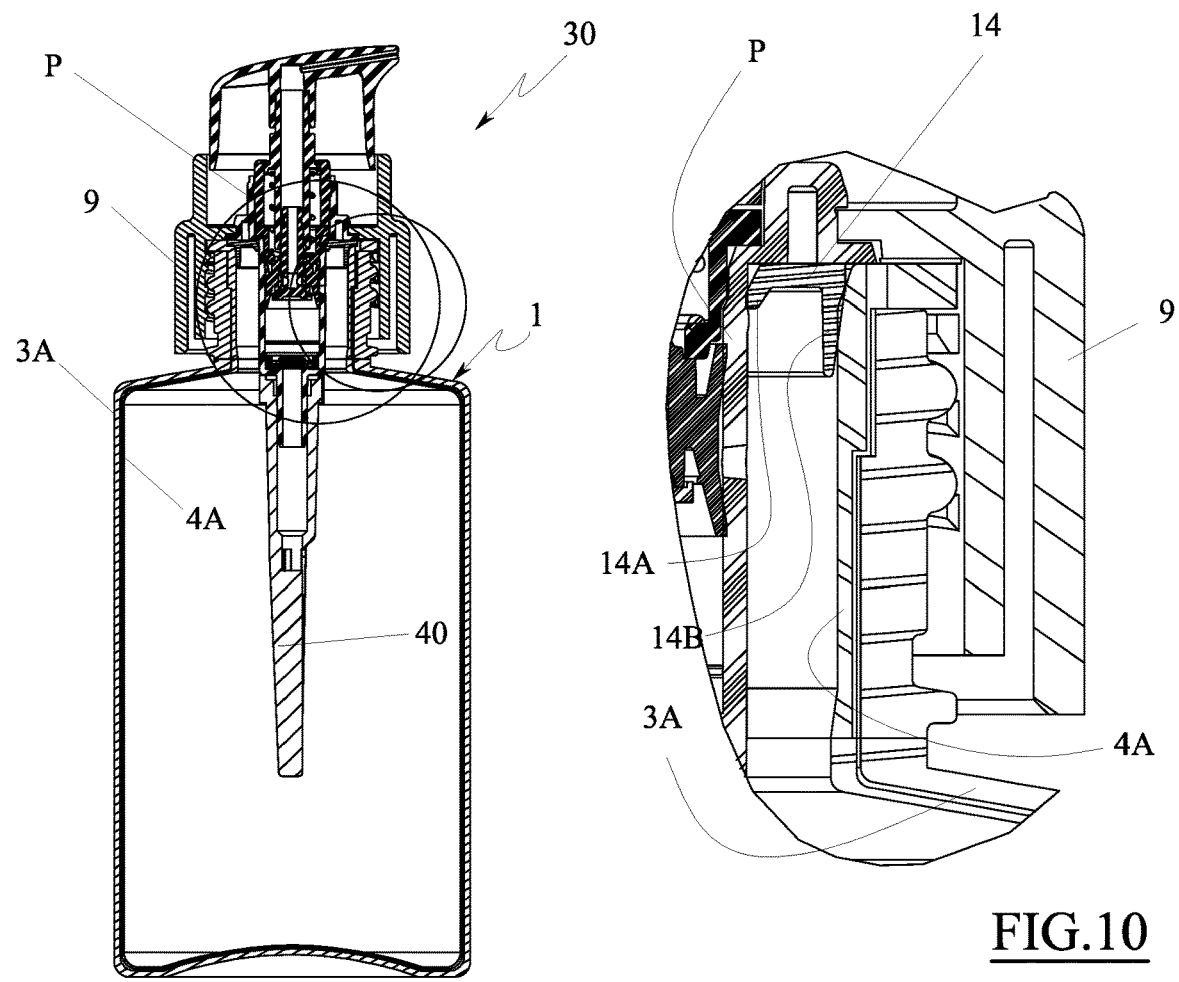
FIG.9
FIG.10
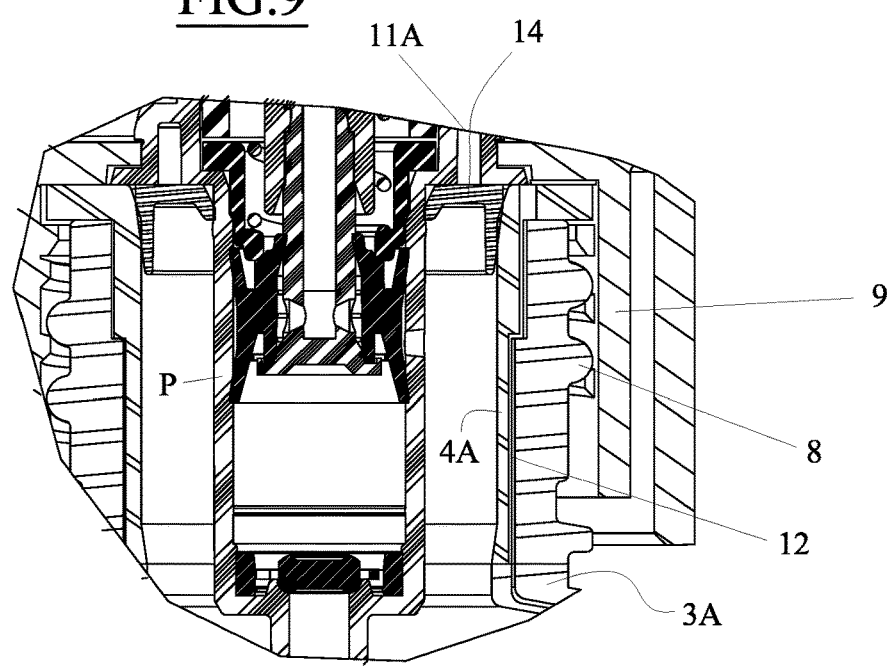
FIG.11

US 12,005,625 B2

METHOD FOR MAKING A CONTAINER FOR A FLUID SUBSTANCE DISPENSING DEVICE AND DISPENSING DEVICE FOR THE SAID FLUID SUBSTANCE

This patent application claims the benefit of Italian Patent Application for Invention No. 102021000017447 filed on Jul. 2, 2021, the disclosure of which is incorporated herein by reference.

FIELD OF THE INVENTION

The present invention relates to a method for making a container for a fluid substance dispensing device. The invention also relates to the dispensing device for the said fluid substance.

BACKGROUND ART

There are various types of commonly known containers for fluid substances. More specifically, there are commonly known containers which comprise a recipient which houses a deformable bag. The deformable bag is usually coupled to a hermetic manual pump for dispensing the contents thereof.

At present, the said containers are produced by blow-moulding the external recipient and subsequently inserting the deformable bag into the external recipient.

The deformable bag may also be blow-moulded within the external recipient, which has been pre-moulded.

The commonly known systems for making the said containers are expensive and, as they include many assembly steps, are also somewhat slow.

SUMMARY OF THE INVENTION

The object of the present invention is to provide a method for making a container which its improved with respect to the commonly known technique.

A further object of the invention is to provide an inexpensive and rapid method for producing the said container.

This and other objects are achieved by means of a method according to the technical teachings of the claims annexed hereto.

Advantageously, the container according to the present invention is ecological, as the external recipient may be separated from the internal deformable bag once the substance contained therein has been completely dispensed.

Another advantage of the present invention is that the volume available to be used to house the fluid substance is greater than that of conventional solutions.

BRIEF DESCRIPTION OF THE FIGURES

Further characteristics and advantages of the invention will become clearer in the description of a preferred but not exclusive embodiment of the container, and the method for making it, illustrated—by way of a non-limiting example—in the drawings annexed hereto, in which:

FIG. 9 is a sectional view of a fluid substance dispensing device which includes the container made using the method according to the present invention;

FIG. 10 is an enlarged view of the part shown in the small circle in FIG. 9;

FIG. 11 is an enlarged view of the part enclosed in the large circle in FIG. 9;

DETAILED DESCRIPTION OF THE INVENTION

Figures 1, 2:
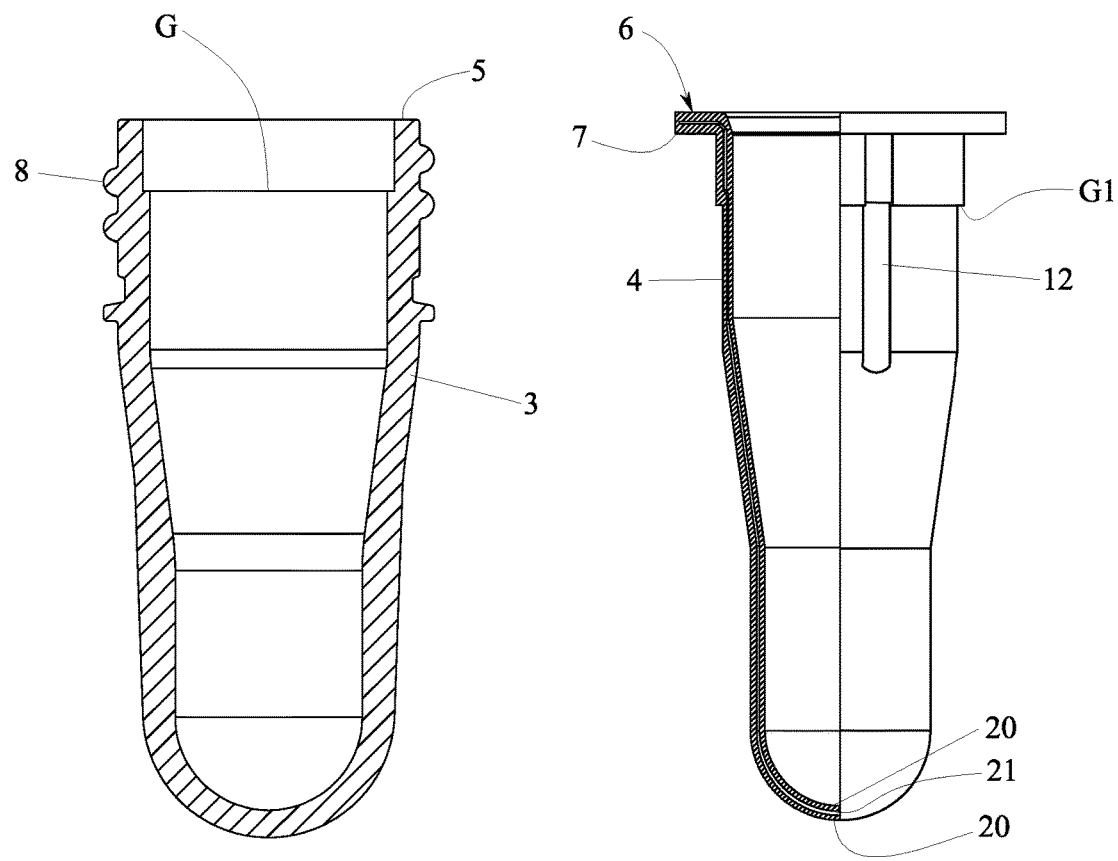
FIG. 1 is a sectional view of an external body of a preform for forming the container according to the present invention.
FIG. 2 is a sectional view of an internal body of a preform for forming the container according to the present invention, made of a multilayer material.

With reference to the figures stated, reference number 1 is used to denote, as a whole, a fluid substance container. The container 1 is made using the method detailed below and is intended to form part of a fluid substance dispensing device 30 (FIG. 9) together with a ring nut 9, a hermetic pump P, and—optionally—a seal 14 envisaged between the pump body and the container 1.

Figure 3:
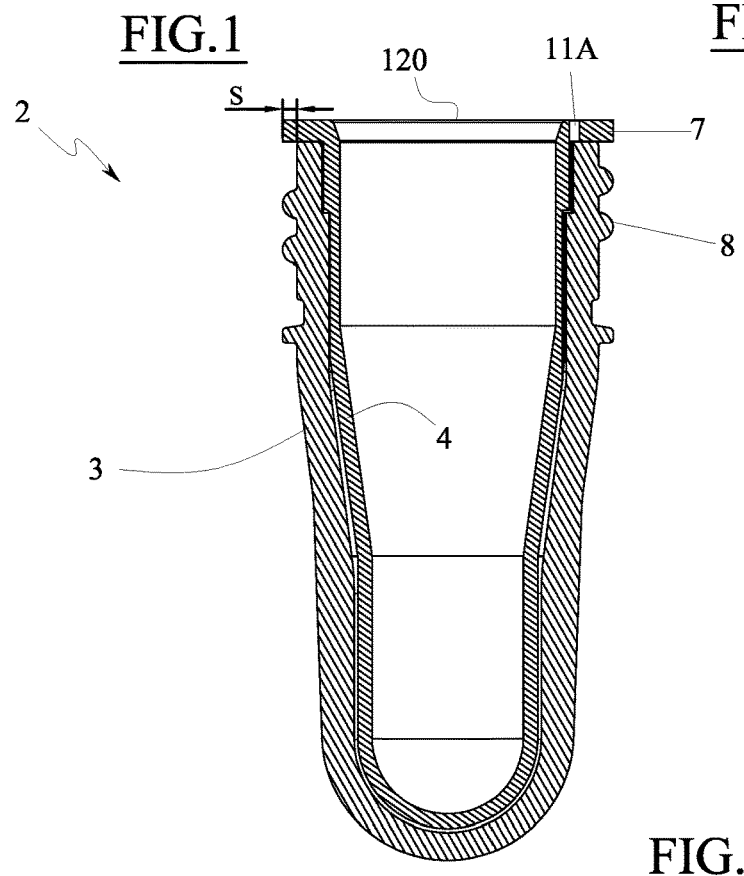
FIG. 3 is a sectional view of a preform for forming the container according to the present invention.

The container 1 is made from a preform 2 (FIG. 3).

Figure 4:
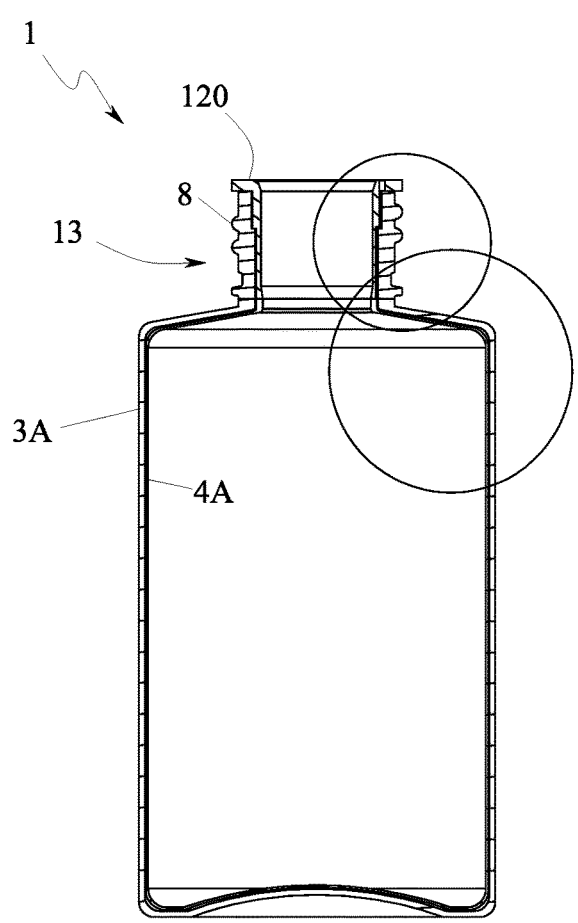
FIG. 4 is a sectional view of the container according to the present invention, made by blow-moulding the preform in FIG. 3.
Figure 5:
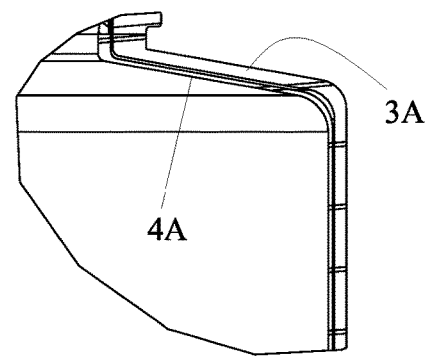
FIG. 5 is an enlarged view of the part shown in the large circle in FIG. 4.
Figure 6:
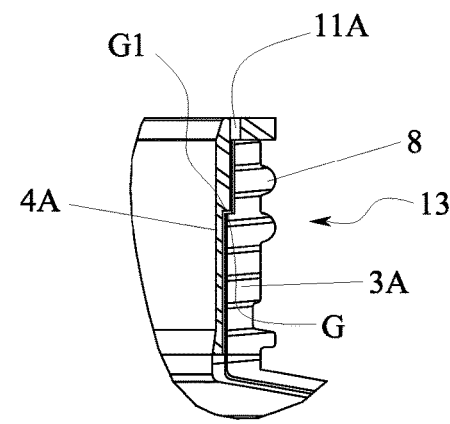
FIG. 6 is an enlarged view of the part shown in the small circle in FIG. 4.
Figure 7:
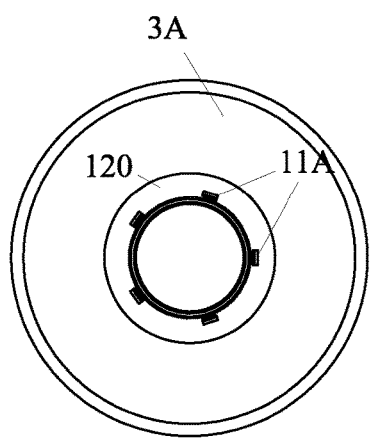
FIG. 7 is a top-down view of the container in FIG. 4.
Figure 8:
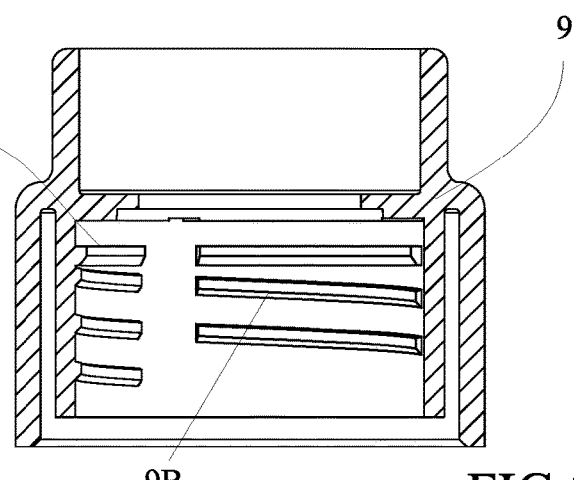
FIG. 8 is a sectional view of a ring nut which is coupled to the container in FIG. 4.
Figure 12:
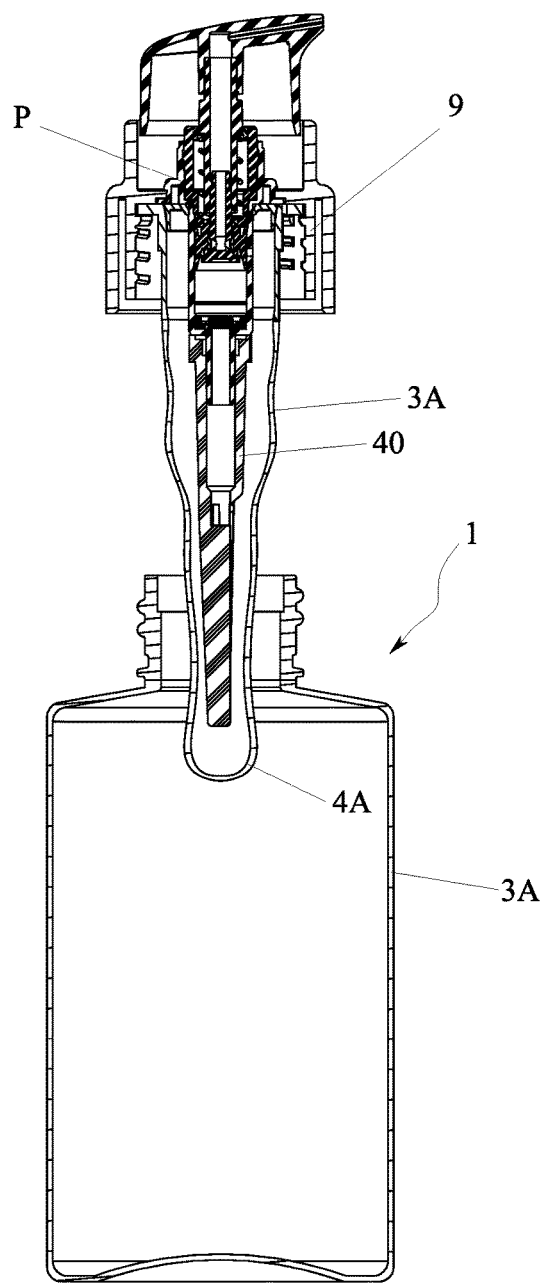
FIG. 12 shows the dispensing device in FIG. 9 during a step in which the deformable bag is extracted from the recipient.

The preform 2 is heated in a conventional way and blow-moulded inside a mould which gives the said preform the external shape of the container 1 (or recipient) visible in FIG. 4.

The container in FIG. 4 has, by way of example, a cylindrical shape, but the final shape of the container may be of any kind, and may even have a square, rectangular, or elliptical plan, or the shape known as a 'tottle' (i.e. with a tapered bottom section, for top-down positioning).

The preform 2 is formed of an external body 3 and an internal body 4, which are mutually assembled before being blow-moulded.

To facilitate assembly, the external body may feature a step G which has a corresponding step G1 on the internal body.

The external body 3 (shaped like a preform) is cup-shaped and is endowed with a first free end 5.

The internal body 4 is also cup-shaped and is endowed with a second free end 6 which has a flange 7 configured so that, when the internal body 4 is assembled with the external body 3, the flange 7 abuts against the first free end 5 and protrudes (see the distance denoted S in FIG. 3) along an external perimeter of the external body 3, precisely in the vicinity of the said free end 5.

Once heated and blow-moulded 'at the same time', the external body 3 is shaped so as to form the exterior 3A of the container 1 (i.e. a separate recipient) while the internal body 4 is shaped so as to form a deformable bag 4A inside the recipient 3A.

The formation of the deformable bag 4A in the recipient 3A takes place in an essentially automatic manner during the said blow-moulding step, which leads to the formation of the external recipient 3A.

Indeed, the internal body 4 and the external body 3 may be heated together and blow-moulded within a single step to form the container 1; the ring nut 9 and the pump P are coupled with the pre-formed container 1 once the bag 4A has been filled.

It should be pointed out that the internal body 4 and the external body 3 may be first assembled together to form the preform 2.

The preform 2, formed by the internal body 4 and the external body is then heated up to make it easily blowable.

Then the preform 2 (again formed by the internal body 4 and the external body 3) is blowed to form in a single step the container 1. This means that the internal body 4 and the external body 3, are blow-molded together, to form the container.

Before blow-moulding them, the internal body 4 and the external body 3 are heated together, at least for a final heating step just before blowing them.

Possibly, before the final heating step, the internal body 4 and the external body 3 may be pre-heated separately, and then assembled together, before receiving a final heating step together, just before blow-moulding.

This technique offers significant advantages over that used conventionally, i.e. that of inserting an already formed deformable bag into the external recipient or container. Indeed, the bag formed in this manner copies the internal shape of the external recipient perfectly, thereby increasing the volume usable to house the fluid substance to dispense.

During blow-moulding, the wall of the deformable bag 4A adheres only partially to the external recipient 3A due to the presence of a gap created by the air already present in the preform 2. Appropriate air passageways 11A, 11B, which will be described below, allow the air to be vented during the step in which the external body 3 and the internal body 4 are coupled to form the preform 2 in FIG. 3. During the step to blow-mould the preform 2, the said air passageways 11A, 11B, may be closed to ensure an air gap is maintained during the forming of the container. The presence of the air gap and the different chemical nature of the materials used, which may shrink at different rates after blow-moulding, facilitates the mechanical/physical detachment of the bag 4A from the recipient 3A.

For this purpose, a blow-moulding head may be used to make a seal on the flange 7 on the internal body, thereby closing the air passageways 11A.

Even in the presence of any 'glue seams' between the bag 4A and the external recipient 3A, these are eliminated once a vacuum is created in the bag 4A with the hermetic pump P, thereby allowing the substance housed within the bag to be pumped out entirely.

Incidentally, the substance housed in the bag may be any type of fluid or liquid, in particular a fluid or liquid used in the cosmetic or medical field; but the deformable bag 4A may be filled (advantageously before installing the pump P) with any type of substance that can be dispensed by a pump.

Between the internal body 4 and the external body 3, the aforesaid air passageways 11A, 11B may be envisaged so that the exterior of the internal body 4 is placed in communication with the exterior of the container 1, which may be done in order to allow an intake of air and therefore a gap between the recipient 3A and the deformable bag 4A during use of the pump P.

The air passageways can also facilitate effective detachment of the bag from the recipient, as already explained above.

Advantageously, the air passageways 11A open onto an upper surface 120 of the flange 7.

In this case, the air passageways 11A can also be used to pressurise (in a step prior to filling, by means of the blow-moulding head, for example) the gap outside the bag 4A, so as to detach the sad bag completely before filling or during the blow-moulding.

Figure 13:
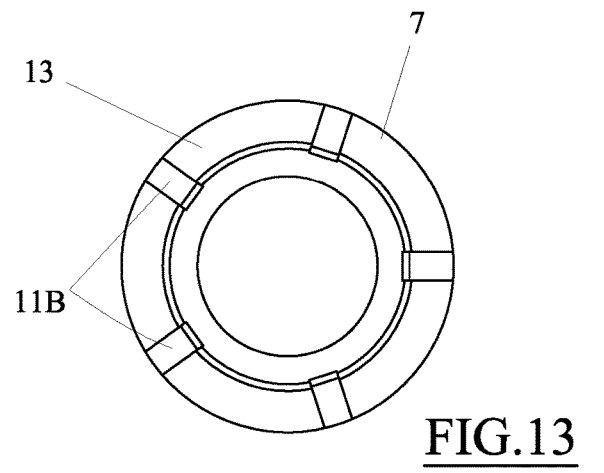
FIG. 13 is a bottom-up plan view of a variant of the internal body in FIG. 2.
Figure 14:
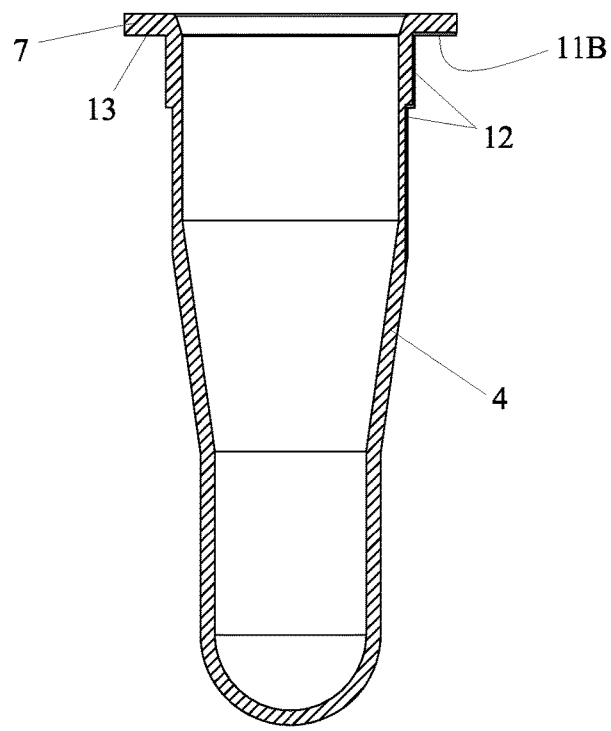
FIG. 14 is a sectional view of the internal body in FIG. 13.

Alternatively, the air passageways 11B may be featured (FIGS. 13 and 14) on a lower surface 13 of the flange 7, abutting against the said first free end 5 of the external body 3

Advantageously, there are channels 12 between the internal body 4 and the external body 3, located in an area which will form a neck 13 of the container 1.

In addition to facilitating the intake of air into the gap area (or the venting of air) through the passageways 11A, 11B, the said channels 12 improve detachment when the bag has to be extracted. Indeed, they are made in parts of the external body and the internal body which are essentially rigid and which essentially do not deform during the blow-moulding to form the recipient and the bag. They are, in fact, positioned in the neck 13.

According to the invention, the ring nut 9 has an undercut 9A which engages with the flange 7 so that when the ring nut 9 is removed from the container 1 (after it has been assembled thereupon to retain the pump P), the said ring nut brings the deformable bag 4A with it (once emptied), in addition to pump P.

In this way, the bag/ring nut/pump assembly can be separated from the external recipient 3A, for effective recycling of the product.

For coupling with the ring nut 9, the external body 3 may feature a thread 8 near the first free end 5, for coupling with a counter-thread 9B on the ring nut 9.

Advantageously, the undercut 9A is located at the top of the counter-thread 9B on the ring nut 9 and may—optionally—have the form of a flattened part 9B1 of the said counter-thread 9B.

Advantageously, as can be seen from the detail in FIGS. 10 and 11, between the pump P and the deformable bag 4A, there is a seal 14 envisaged, which is endowed with a first sealing lip 14A (on the body of the pump P) and a second sealing lip 14B (on an internal surface of the deformable bag 4A).

Figure 15:
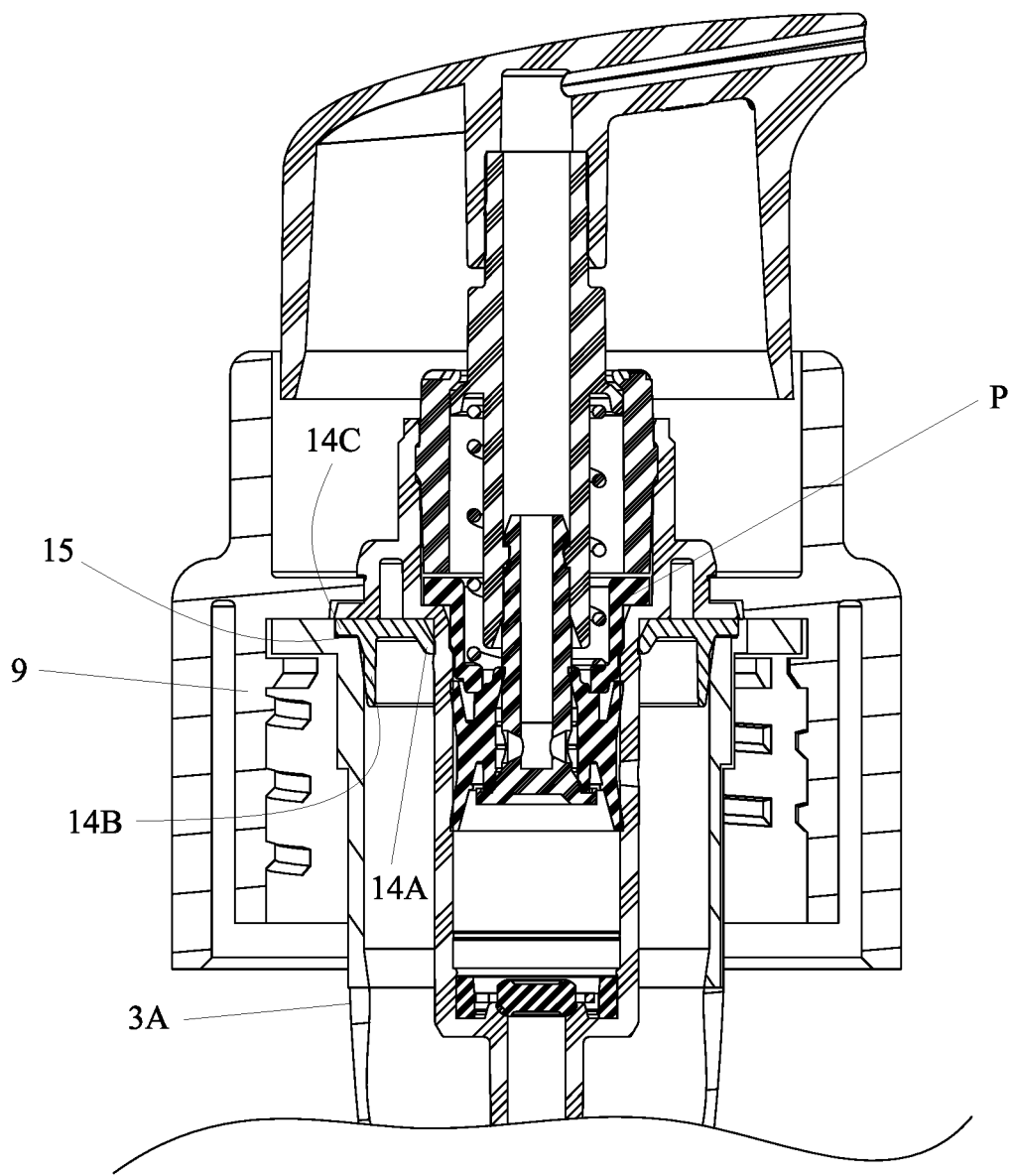
FIG. 15 is a sectional view with simplified details of a coupling between a pump and a variant of the internal body in FIG. 2.

The seal 14 may also have the configuration shown in FIG. 15 and therefore be endowed with its own flange 14C housed in a seat 15 featured on the flange 7 on the internal body 3. It should be noted that for the sake of simplicity, in FIG. 15, neither the recipient 3A nor the priming tube 40 are shown.

A pump flange can sandwich together the seal flange 14C and the internal body flange 7 (or bag 4A).

The internal body 3 may be formed of two external layers 20 and a barrier layer 21 sandwiched between the external layers 20, as can be seen in FIG. 2.

The internal body may also be made of a single material.

By way of example, the external body 3 may be made of one or more of the following materials: PET-PET PCR-HDPE-HDPE PCR-PP-PP PCR.

The internal body 4 may be made entirely of PET, PET PCR, HDPE, HDPE PCR, PP, PP PCR, or of PET-PA-PET multilayer, PET PCR-PA-PET PCR multilayer, HDPE-EVOH-HDPE multilayer, HDPE PCR-EVOH-HDPE PCR multilayer, PP-EVOH-PP multilayer, or PP PCR-EVOH-PP PCR multilayer.

Advantageously, the external body 3 and/or the internal body 4 are made by injection moulding.

The invention also relates to a fluid substance dispensing device 30 made with a container 1 according to one or more of the appended claims, the device comprising a hermetic pump P coupled with the container by means of a ring nut 9, there being a seal 14 envisaged—optionally—between the pump P and the container 1.

Advantageously, the pump P may be coupled with a 'long' rigid suction tube 40, which helps the deformable bag to deform around it, in preparation for the extraction step.

Various embodiments of the innovation have been disclosed herein, but further embodiments may also be conceived using the same innovative concept.

The invention claimed is:

1. A method of making a container (1) of a fluid substance starting from a preform (2), the container (1) being associated by a ring nut (9) to a hermetic pump (P) to form a dispensing device of a fluid substance (30), comprising the steps of heating the preform and blowing it to obtain the container (1), the preform (2) being formed by an external body (3) and an internal body (4) mutually assembled via a coupling step before being blown, the external body (3) being cup-shaped and equipped with a first free end (5), the internal body (4) being cup-shaped and having a second free end (6) which has a flange (7) configured so that, when the internal body (4) is assembled to the external body (3), the flange (7) abuts against the first free end (5) and perimetrically protrudes (S) with respect to an external perimeter of the external body (3) in proximity of said free end (5), the external body (3) being configured to form, once blown, an outer vessel (3A) of the container (1) while the internal body (4) being configured to form a deformable bag (4A) housed inside the container (1), the ring nut (9) having an undercut (9A) which engages the flange (7) so that, when the ring nut (9) is removed from the container (1), after that it has been assembled on the container (1) to hold the pump (P), brings with it the empty deformable bag (4A) together with the pump (P), wherein the ring nut (9) and the pump (P) are associated with the container (1) already formed, characterized in that the inner body (4) and the outer body (2) are heated together and blown in a single step to form the container (1), and during blowing, the wall of the deformable bag (4A) only partially adheres to the outer vessel (3A) due to the presence of an air gap present in the preform (2), wherein suitable air passages (11A, 11B) allow air to be discharged during the coupling step between the outer body (3) and the inner body (4) to form the preform (2), wherein the same air passages (11A, 11B), during the blowing phase of the tube (2), are closed to ensure the maintenance of an air gap during the bottle forming.

2. The method according to claim 1, in which the external body (2), near the first free end (5), has a thread (8) for coupling with a counter-thread (9B) of the ring nut (9).

3. The method according to claim 2, wherein the undercut (9A) is defined at the top of the counter-thread (9B) of the ring nut (9).

4. The method according to claim 1, in which air passages (11A, 11B) are provided between the internal body (4) and the external body (3) which put the exterior of the internal body (4) in communication with the outside of the container (1).

5. The method according to claim 4, wherein the air passages (11A) open on an upper surface (12) of the flange (7) or on a lower surface (13) of the flange (7) in abutment against said first free end (5) of the external body (3).

6. The method according to claim 1, in which channels (12) are provided between the internal body (4) and the external body (3), located in correspondence with an area that will form a neck (13) of the container (1), the channels communicating with said passages (11A, 11B).

7. The method according to claim 1, wherein between the pump (P) and the deformable bag (4A) there is provided a sealing gasket (14) equipped with a first sealing lip (14A) on the pump body (P) and a second sealing lip (14B) on an internal surface of the deformable bag (4A), or in which the sealing gasket (14) is equipped with its own flange (14C) housed in a seat (15) provided on the flange (7) of the internal body (3).

8. The method according to claim 1 in which the inner body (3) is formed by two external layers (20) and a further layer (21) sandwiched between the external layers (20).

9. The method according to claim 1, wherein the outer body (3) or the inner body (4) are made by injection molding.

* * * * *